United States Patent [19]

Shell

[11] Patent Number: 4,691,199

[45] Date of Patent: Sep. 1, 1987

[54] CURSOR POSITION CONTROLLER

[75] Inventor: Stanley Shell, Waban, Mass.

[73] Assignee: Digital Equipment Corporation, Maymard, Mass.

[21] Appl. No.: 730,305

[22] Filed: Mar. 5, 1985

[51] Int. Cl.$^4$ .............................................. G09G 1/00
[52] U.S. Cl. .................................. 340/710; 340/706; 340/709; 178/18
[58] Field of Search ............ 340/710, 709, 706, 365 P, 340/792, 793; 178/18; 250/221, 211 K; 235/454, 455, 465; 356/373, 375

[56] References Cited

U.S. PATENT DOCUMENTS

| | | | |
|---|---|---|---|
| 4,364,035 | 12/1982 | Kirsch | 340/710 |
| 4,443,694 | 4/1984 | Sanford | 235/465 |
| 4,521,772 | 6/1985 | Lyon | 340/710 |
| 4,564,835 | 1/1986 | Dhawan | 340/710 |
| 4,631,400 | 12/1986 | Tanner et al. | 340/710 |

*Primary Examiner*—Marshall M. Curtis
*Assistant Examiner*—Ruffin B. Cordell
*Attorney, Agent, or Firm*—William E. Cleaver

[57] ABSTRACT

The present system includes an optical reflective sensor, which is hand held and moved over a color density scaled grid, such as a gray scale grid, to produce analog signals which, when processed, become the basis for the direction of movement of a screen cursor. The analog signals are converted into binary coded signals and further into hexadecimal signals. Each hexadecimal signal is transmitted to eight AND gates whose other inputs represent a (gray scaled) value of a position from where the sensor could have been moved. Accordingly only one AND gate will produce an output signal and that output signal will only be produced if the move is a valid, or acceptable, move. If the sensor has been validly moved, the output signal of the selected AND gate will be interpreted (circuit-wise) to represent one of the directions of a compass. The output signal will be used to change the state of a bit map memory to thus move the screen cursor. Hence the screen cursor will follow the sensor. If the movement of the sensor is not valid, the screen cursor will remain where it was prior to the last movement of the sensor, and when the user next makes a valid movement of the sensor, the screen cursor will again be moved.

5 Claims, 6 Drawing Figures

CURSOR POSITION CONTROLLER

BACKGROUND

The use of a "mouse" or a cursor position controller is well understood. Heretofore the mouse device has, for the most part, been a mechanical device such as that described in U.S. Pat. No. 3,541,521. Such mouse devices normally have a ball member which is rolled over a desk top, or table, or an enlarged pad. The surface over which the ball is moved must provide a sufficient coefficient of friction so that the ball does not skid. Inside the housing, of the prior art mouse, there are normally located two frictionally driven wheel arrangements which are oriented substantially perpendicular to one another. The wheels are frictionally coupled to the ball so that as the ball is moved on the surface of the desk, or the like, the movement of the wheels represents a resolution of the movement of the ball into components about two transverse axes. The movement of the wheels, in the prior art, has been quantified by employing potentiometers coupled to the wheels, or by employing perforated disks coupled to the wheels, with a light source and light sensitive device respectively disposed on either side of such a perforated disk. The last mentioned devices count perforations passing between the light source and the light sensitive device. Such prior art arrangements have suffered from skidding, or slipping, because of an improper surface, or a worn surface, over which the mouse is rolled; or from dirt being picked up by the roller and impeding the movement of the roller; or from having the dirt move into the path of the wheels which are frictionally coupled to the roller; or from the fact that the user failed to exert a sufficient downward pressure to provide the necessary frictional force; or from the dirt moving onto the electrical contacts, or the potentiometer, or across the face of the light emitter, or light receiver, to mention just some of the infirmities of the mechanical mouse.

Other cursor position controllers of the prior art have attempted to reduce the inherent problems of the mechanical mouse by employing an optical cursor control device. Such a system is described in U.S. Pat. No. 4,409,479. In the '479 system there is a light source within a housing and also enclosed therein are two X direction light sensitive devices and two Y direction light sensitive devices. The '479 system employs a planar grid which is made up of light absorbing bands and light reflecting spaces between the bands. The width of a band and the width of a space are identical. The light sensors detect the movement of the mouse in the X and Y directions and generate quadrature signals which are indicative of that movement. Such a system requires that the movement of the mouse be substantially commensurate with the bands and the spaces of the grid and that there be two sensors in each of the X and Y directions. The present system permits the user to move the sensor with less conformity to a grid and without employing two sensors in each of the X and Y directions.

SUMMARY

The present system employs an optical sensor controller in which there is one light source and one light detector. The sensor device is hand held in the same fashion as the well known mouse. The sensor is moved over a gray code grid and each segment, or square, of the grid is a different shade of gray. Therefore each square has a different density value and a different light reflecting value. Each square of the grid is surrounded by eight different squares, each of whose light reflectivity value differs from each surrounding segment by at least two units of value. Accordingly when the sensor moves from one square to another, as the user moves the sensor, the system provides an analog signal from the newly detected square. The last mentioned analog signal is different in value from the value of the square from where the sensor was moved. The analog signal is translated into a digital signal and transmitted to logic circuitry, such as a state machine or a microprocessor, or the like, which processes the newly generated digital signal to determine whether or not the sensor has made a valid move. If the newly generated digital signal completes the activation of a gate within the logic circuitry then the system recognizes the movement of the sensor as acceptable and generates the proper coordinate signals to the display device to move the screen cursor in the correct direction. If no gate is activated, (which would indicate an unacceptable move), the screen cursor remains stationary and the system considers the next analog signal as a basis for moving the screen cursor.

The object and features of the present invention will be better understood in view of the following description taken in conjunction with the drawings wherein.

Figure 1:
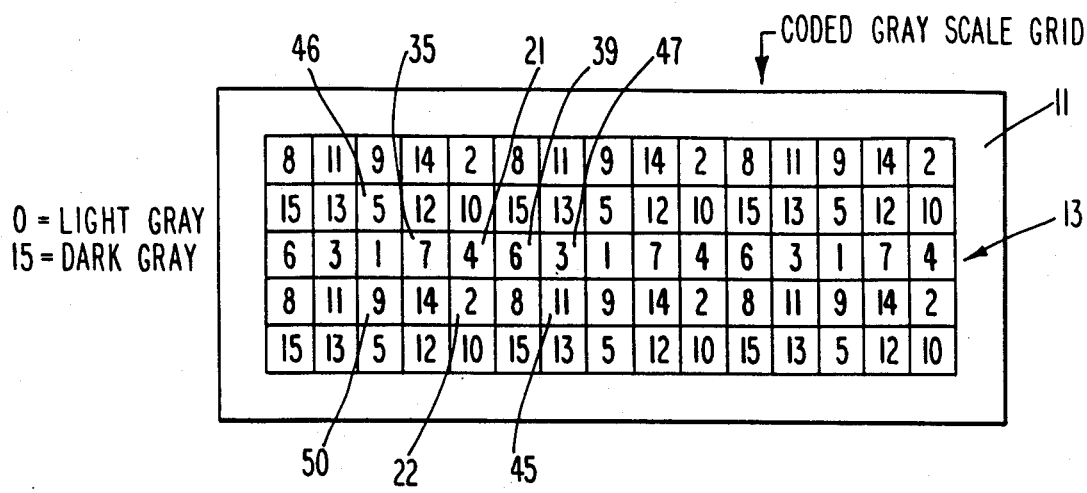
FIG. 1 is a layout of a coded gray scale grid which can be employed in the present system.

Consider FIG. 1. In FIG. 1 there is shown an arrangement of a coded gray scale grid. It should be borne in mind that each square or segment of the grid of FIG. 1 is a shade of gray corresponding to the number in the square, i.e., shades 1–15. If we consider that a "no gray" (white) situation has a value of "0" then a "no gray" situation would be as though the light from the light source in the sensor is fully reflected. Hence a value of "15" on the gray scale grid means that the shade of gray is very deep, tending toward black, i.e., where all of the light is absorbed. It should be understood that the gray scale concept is well understood and used in the graphic arts, where tones and half tones and different shades of gray are employed in obtaining printing effects. It should also be understood that while a gray scale grid is used in a preferred embodiment, the squares could be shades of a color or even color combinations, so long as the light reflectivity is such that different numerical values for the squares can be generated. It should also be understood that there are numerous other patterns of numerical values (i.e., different combinations than shown in FIG. 1) which could be used.

Note that in FIG. 1 that each numerical value of a square, or segment, differs from each of the eight (8) surrounding numerical squares by two units of value, which provides the system with a safety margin of signal strength when operating the system. The gray scale grid of FIG. 1 is printed on a sheet of paper 11, through photographic techniques that are well known. It should be clear that the grid could be displayed on other means than a sheet of paper. Each square of the grid 13 can be as small as 0.01 cm square which can approximate 1 pixel on the display screen. Other square sizes, of course, could be chosen.

Figure 2:
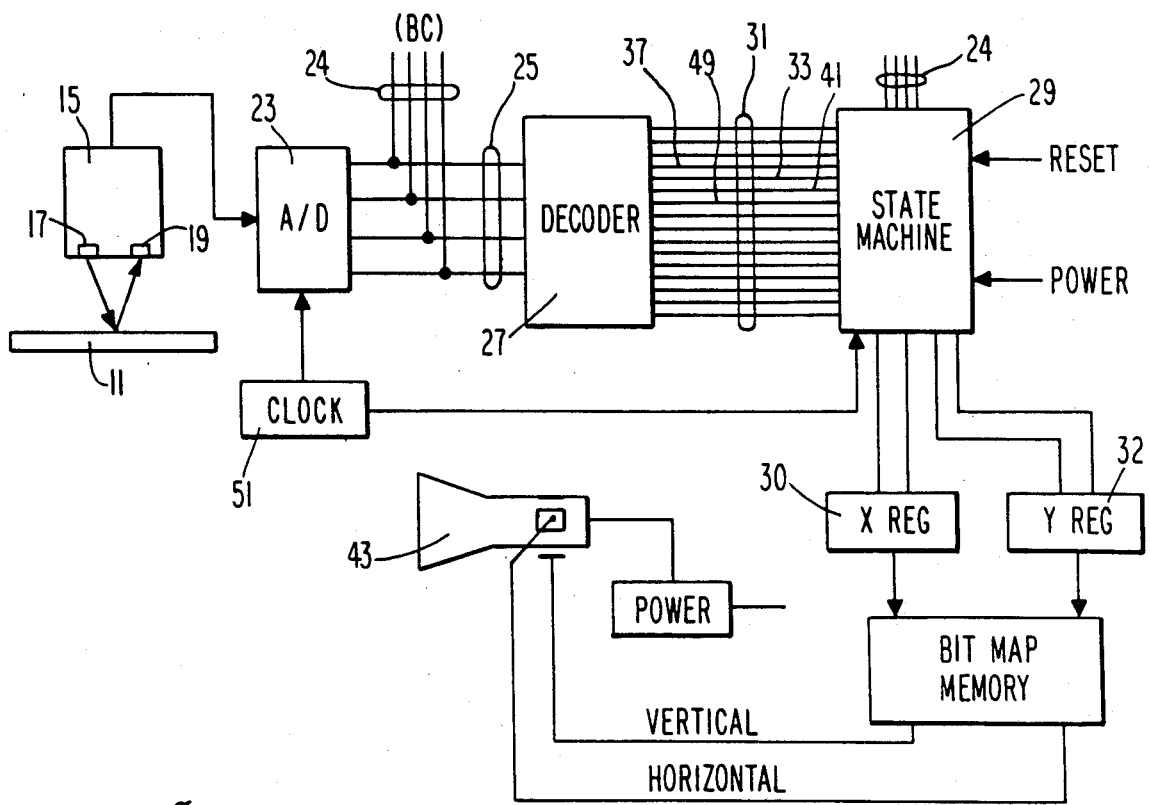
FIG. 2 is a block diagram of the circuitry of one embodiment of the present system.

In FIG. 2 there is shown the paper 11 upon which the grid 13 is printed. Hand held above the paper 11 is a sensor, or an optical cursor control device, 15. The optical cursor control device 15, in a preferred embodiment, is an HEDS-1000, High Reflector Optical Reflective Sensor, manufactured by the Hewlett Packard Corporation. However other kinds of optical reflective devices could be used. Light is transmitted from the light source 17 to the gray scale grid on paper 11 and reflected therefrom to the light detector 19. The light detector 19 generates an analog signal whose amplitude is commensurate with the light reflectivity from the square over which the sensor 15 is located. If the sensor 15 were over the "4 square" 21, of grid 13, then there would be an analog signal indicating the presence of a relatively light shade of gray (worth only a value of "4") in the square 21. The analog signal is amplified in the sensor 15 and transmitted to the analog to digital (A/D) converter 23. In the A/D converter 23, the analog signal is transformed into binary coded signals which are transmitted over lines 25 to the decoder 27. In the preferred embodiment the A/D converter 23 is an ADC 0800 manufactured by National Semiconductor Corporation while the decoder 27 is a CD4514B manufactured by National Semiconductor Corporation. It should be understood that other forms of A/D converters and other forms of decoders could be used.

Figure 4:
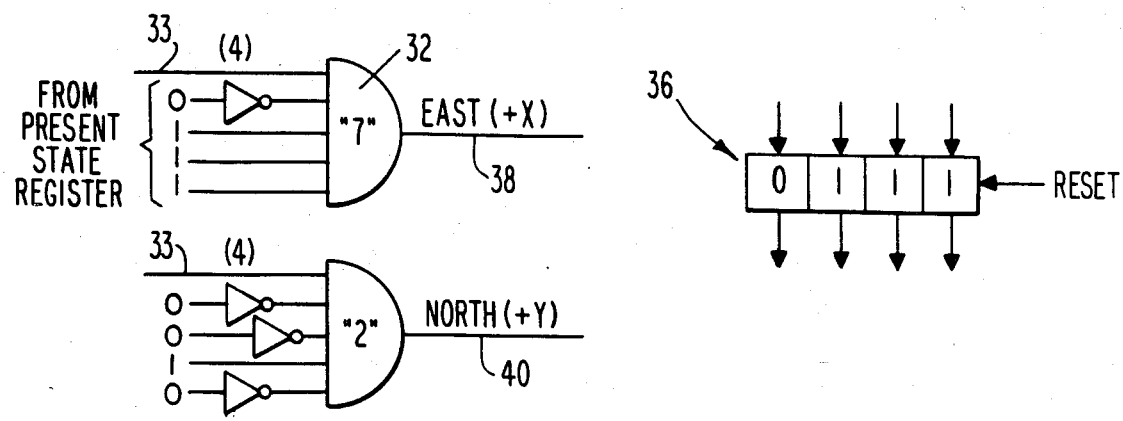
FIG. 4 shows two gates of a plurality of gates which process the same digital input signal.

The decoder 27 accepts the binary coded signals and converts them into one of sixteen hexadecimal values (0-15) to represent the values on the gray scale grid 13 (plus the value zero). The sensor 15 will register, or transmit, a zero value if the sensor is lifted from the grid and the ambient light strikes the light sensitive device or the sensor is moved into the border area. A zero value is one way of indicating an invalid move. The sixteen signal lines are connected to the state machine 29. The state machine 29 is a programmable device which can handle a great deal of data processing. In the state machine 29 there is a plurality of AND gates. Each of the lines 1-15 (not the zero value) represents one input line to each of eight AND gates. This can be better understood by examining FIG. 4. In FIG. 4 there are shown two AND gates 32 and 34. While not shown it should be understood that there are six additional AND gates to accommodate line 33. It should also be understood that there are eight AND gates to accommodate each of the lines 31 (FIG. 2) with the exception of the first line which is the zero line. Hence there are 120 AND gates (8 AND gates times 15 value) to determine direction of movement. The upper input line 33, which is connected to both AND gates 32 and 34, is the value "4" line 33, shown in FIG. 2. If we examine square 21 of FIG. 1, we find that square 21 has a value of "4". If the sensor is moved to square 21, it must come from a square having one of the values "12," "10," "15," "6," "8," "2," "14," or "7," to be a valid move. By way of further explanation, there is shown in FIG. 4 a present state register 36 which has the value of "7" stored therein. The value of "7" is in binary code with the least significant value being on the right hand side. This would indicate that the sensor in our example would have been moved from square 35. Note that the values of the lower four lines into AND gate 32 represent a "7" in binary code. The output signals from the present state register 36 are connected to the lower four input lines of each of the AND gates. Hence if there is a "7" loaded into the present state register, the AND gate 32 would be fully conditioned upon the arrival of a signal on line 33 and there would be an output signal on line 38. While the signals representing the value of "7" would be transmitted to each of the eight AND gates accommodating line 33 only AND gate 32 would be responsive. AND gate 34 is demonstrative of the logic. AND gate 34 is a "2" AND gate and when the present state register 36 has a binary value of "2" loaded therein, the AND gate 34 will be fully conditioned to provide an output signal on line 40.

If we examine FIG. 1 again, we find that if the present state register 36 has a value of "7" loaded therein, it means that the sensor is sitting in square 35. When the sensor is moved to square 21, it would have moved in an easterly direction. Accordingly the output signal from AND gate 32 represents a movement of the sensor in an easterly direction or is considered +X movement. By way of further example if the present state register held a binary code of "2" (0010) therein it would indicate that the sensor was sitting in square 22. The output signals from the present state register 36 would substantially condition AND gate 34 so that a signal on line 33 would produce an output signal on line 40. When the sensor 15 is moved from square 22 to square 21, the AND gate 34 will produce an output signal on line 40, which output signal indicates that the sensor 15 has moved in a northernly direction or has made a +Y movement.

Figure 5:
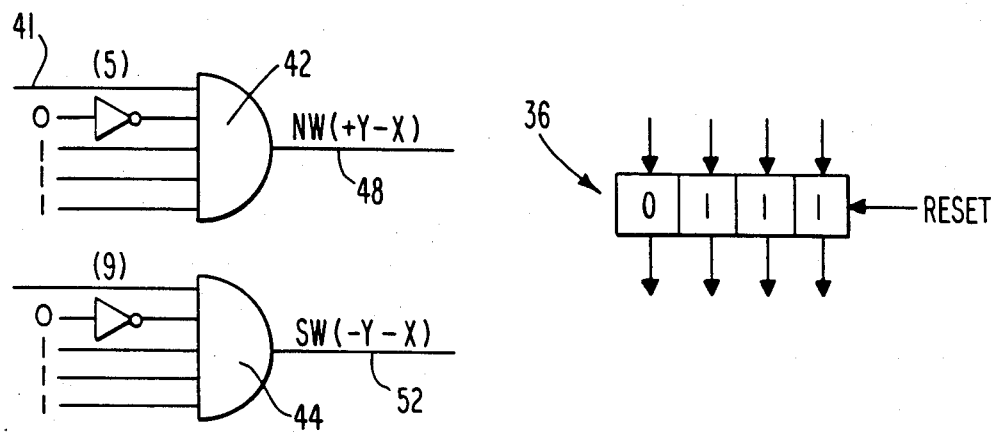
FIG. 5 shows two gates of a plurality of gates which process different digital input signals with the same present state signals.

In FIG. 5 there are depicted two more of the 120 direction AND gates. These two AND gates are similar in that they both handle present state "7" conditions. For instance if the sensor 15 were in square 35 and it were moved to square 46, then line 41 (from FIG. 2) would have a signal thereon, indicating that the sensor had been moved to a square having a value of "5." The signal on line 41 along with the signals from the present state register 36 would fully condition the direction AND gate 42. Accordingly there would be an output signal on line 48 indicating a northwest movement of the sensor 15. A northwest movement represents a (+Y,−X) movement. On the other hand if the sensor 15 had been moved from square 35 to square 50, then AND gate 44 would be fully conditioned and there would be an output signal on line 52. The output signal on line 52 indicates a southwest movement or a (−Y,−X) movement.

As mentioned earlier, in a preferred embodiment, there are eight AND gates for each of the lines 31 (with the exception of the zero line). For each square wherein the sensor can be located, there are eight valid squares to which it can be moved (i.e., the surrounding squares) and for each square into which the sensor can be moved, there are eight possible value squares from which it could be moved. Any move from one square to another that does not meet the foregoing constraints is considered an invalid move and the screen cursor will accordingly remain in its present location.

If we consider the case where reading the square 21 is the first reading, i.e., the start up position, then the lower four lines into the eight AND gates, which accommodate the present state value of "4", would be energized. However none of these AND gates would be fully conditioned because line 33 is not an input line into any of these AND gates. Hence the screen cursor remains wherever it was located when the system is initialized. It should be understood that the screen cursor could be moved to a predetermined location upon each initialization by providing logic circuitry (which is well understood by those skilled in the art) to load the register 30 and 32. Be that as it may, in the embodiment shown, when the sensor 15 is moved from square 21 to, for instance, square 39, an AND gate, not shown, having inputs which are binary coded "4", from the present state register, and a connection to line 49 (an input signal having a decimal value of "6") will be fully energized indicating a movement to the East or a +X movement.

As mentioned earlier, in the case of an invalid move, the present system has the screen cursor remain in the present position and awaits the next move. For instance, if the sensor had been located in square 21 and were moved above square 39 to square 47, such a move would be considered invalid. In such circumstances the present state register 36 would provide the value of "4" in binary coded signals to eight AND gates which accommodate the present state of "4". But none of those AND gates would have its upper input line connected to line 37 (the value "3" line) from decoder 27 (FIG. 2). Accordingly none of those AND gates would provide an output signal and hence there would be no signals to increment or decrement the registers 30 and 32. If we examine FIG. 6 we can better appreciate how the foregoing is accomplished.

Figure 6:
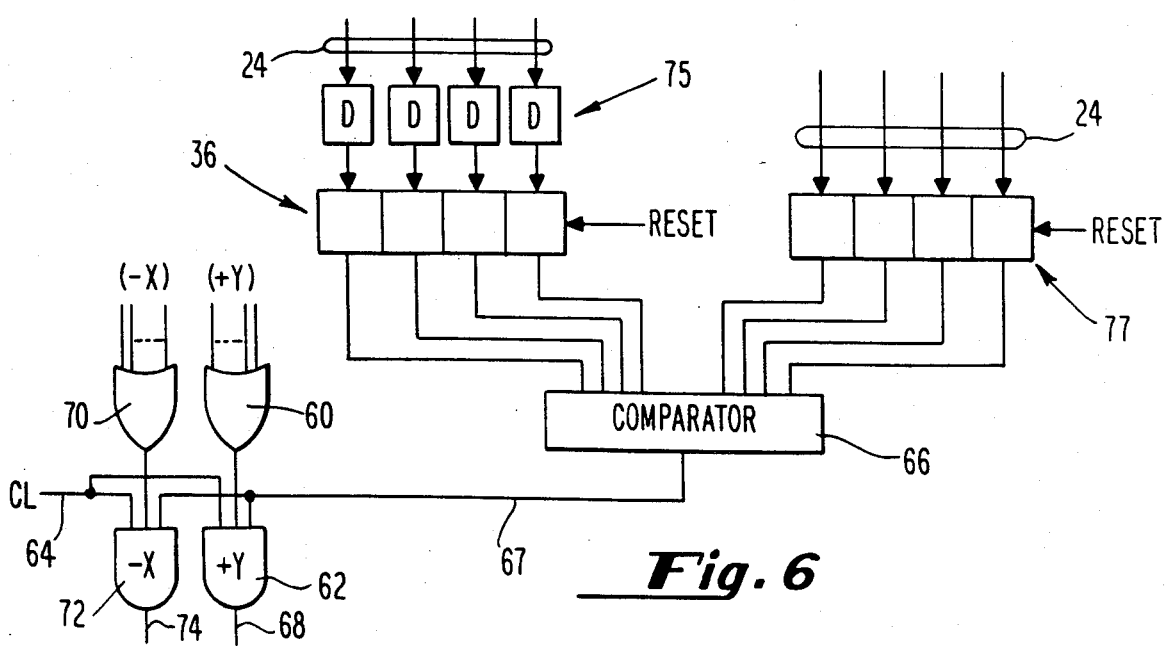
FIG. 6 depicts some logic circuitry which uses the output signals from gates, such as shown in FIGS. 4 and 5, to generate coordinate signals.

In FIG. 6 there are shown two OR gates 60 and 70 each of which has a plurality of input lines. Each of the direction AND gates mentioned above (such as gates 32, 34, 42, 44 and the others not shown) is connected to one or two of four OR gates depending upon whether its output is +X, −X, +Y or −Y or any combination thereof. For instance AND gates 34 and 42 of FIGS. 4 and 5 have a +Y output. It should be noted that AND gate 42 has a −X output as well. Nonetheless the output signals of both AND gates 34 and 42 are connected to OR gate 60. The output line of OR gate 60 is connected to the AND gate 62. One of the other input signals to the AND gate 62 is a clock signal on line 64, while the remaining input signal to AND gate 62 is from the comparator 66. We will discuss the operation of the comparator 66 and the clock signal on line 64 hereinafter. Meantime we will assume that both the clock signal and an output signal from comparator 66 are present. Hence if either of the AND gates 34 or 42 provides an output signal there will be a +Y signal on line 68 which will increment the Y register 56 shown in FIG. 2. In like manner the output lines of AND gates 42 and 44 are connected to the OR gate 70. The output line of OR gate 70 is connected to the AND gate 72. Again assuming that the clock signal on line 64 is present and the signal from the comparator 66 is present, if either of the AND gates 42 and 44 provides an output signal the AND gate 72 will be fully conditioned and there will be a −X signal on line 74 to decrement register 30 (FIG. 2).

It should be understood that there is a +X OR gate and a −Y OR gate. It should also be understood that there is an input line connection into the appropriate OR gates for each of the 120 direction AND gates.

In FIG. 6 the present state register 36 is shown. The signals from the A/D converter 23 (in FIG. 2) are transmitted on lines 24 to the delay circuit 75. The delay circuit 75 delays the signals for a sufficient amount of time to permit the decoder 27 to provide hexadecimal signals, such as the signal on line 33, to the appropriate direction AND gates so that an output therefrom through the coordinate OR gate or gates (such as OR gates 60 and 70) can reach the input to the coordinate AND gate or gates (such as AND gates 62 and 72) before the present state register is written over. As long as the sensor remains on the same square, the present system does not want the coordinate registers 30 and 56 to be either incremented or decremented. The system effects the incrementing and decrementing of the registers 30 and 56 only when the sensor 15 is moved to an adjacent square. The value of the adjacent square, i.e., the new location of the sensor, is transmitted in binary coded form directly over lines 24 into the new register 77. If the sensor 15 has been moved, the value of the new square will be loaded into register 77 before it is loaded into the present state register 36. Accordingly the comparator 66 will experience a mismatch and there will be an output signal on line 67. The signal on line 67 provides an input signal to the coordinate AND gates, such as AND gates 62 and 72. As explained earlier, the second input to those coordinate AND gates is from the direction AND gates. The clock signal on line 64 acts to synchronize the output from the coordinate AND gates with the remainder of the system.

The invalid move is in one instance quite acceptable. It should be understood that the gray code grid 13 does not cover all of the space of the display screen. Therefore the user may move the sensor to the edge of the gray scale coded grid 13 before the screen cursor has been moved to the desired location on the screen. For instance if the user were moving the screen cursor (in response to moving the sensor) downward and "ran out" of space on the gray scale grid 13, then the sensor 15 would be lifted from the bottom of grid 13 and returned to the top of grid 13. The screen cursor would remain in place while the sensor was being lifted to the top of the grid because such as move is an invalid move. However it is precisely how the user wants the system to work because now the sensor can be moved downward once again and the screen cursor is likewise moved downward.

It will be noted in FIG. 2 that there is a clock 51 connected to the A/D converter 23 and the state machine 29. The clock 51 in a preferred embodiment is a RASCO is manufactured by Motorola, Inc. In a preferred embodiment the clock 51 runs at 16 mhz and clocks both the A/D converter 23 and the state machine 29. The 16 mhz runs the state machine 29 directly and is divided by 32 to run the A/D converter 23 at 800 khz. At a clock rate of 800 khz and a grid size of 1/200 inches on a side, for each square, the sensor 15 may be moved across the grid at speeds approaching 90 inches per second and yet have the system remain in synchronization.

Figure 3:
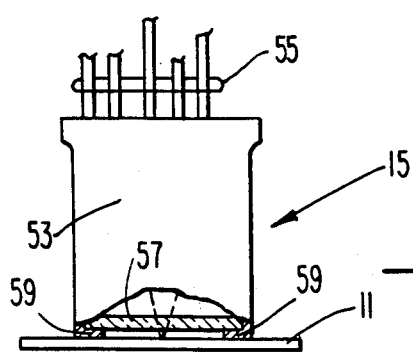
FIG. 3 is a pictorial of a hand held controller device which can be used with the present invention.

FIG. 3 depicts an embodiment of the sensor which is used in a preferred embodiment of the system. In FIG. 3, the sensor 15, is shown with a housing 53 surrounding the light generating means and the light sensitive means, as well as amplifying circuitry. The terminals 55 are connections to the analog input of the analog to digital converter. Note in FIG. 3 that the lens 57 is held by wrap around feet such as elements 59. The feet like element 59, or riding supports, as well as the lens 57 are shown in cross section. The housing 53 is shown broken away to reveal the lens and the riding supports. In a preferred embodiment the lens 57 is circular in shape as are the riding supports 59. The housing 53 is formed to fit over the riding supports allowing virtually no ambient light to enter the chamber within the housing 53 wherein the light generating means 17 and the light sensitive device 19 are housed.

A suitable microprocessor would be programmed to do the following:

(1) Reset the registers on start up;
(2) Receive a present position signal on one of the lines 31;
(3) Use the present position signal to set a register in the microprocessor to the correct present state;
(4) Upon receipt of a new position signal check its validity and if valid, generate the proper coordinate signal or signals and set the register to the new present state;
(5) If not valid do steps 2-4 again; and,
(6) If valid do step 4 again.

The present arrangement permits the user to employ an optical sensor with no moving parts and directly determines the movement of the sensor by the value of the gray scale block to which the sensor is moved. While the system has been described with a hard wired sensor, the sensor need only be energy connected to the A/D converter, i.e., through infrared energy signals, video signals, or connected through fiber optics, to be within the spirit of the invention.

I claim:

1. A system to be used with an electron beam display device, which display device has means to position a cursor, by coordinate control signals, and with said system designed to enable said cursor to be selectively and randomly moved to random display positions on said display device, comprising in combination: transducer means having light source means and light sensitive means for generating analog signals each of whose amplitude is commensurate with the amount of light reflected from a surface to said light sensitive means at the time of analog signal generation; surface means having a plurality of discrete area means each of which lies in abutting relationship with N other discrete area means and each of which is formed to partially absorb and partially reflect light transmitted thereto from said light source means; each of said discrete area means being formed to absorb a different amount of light each of the discrete area means which lies in abutment therewith and each of said N other discrete means being formed to absorb a different amount of light then every other discrete area means of said N other discrete area means; each of said discrete area means being formed to reflect a different amount of light than each of the discrete area means which lies in abutment therewith and each of said N other discrete area means being formed to reflect a different amount of light than every other discrete area means of said N other discrete area means; said light sensitive means being capable of generating an analog signal for each discrete area means, which has an amplitude which is different from the amplitude value of any analog signal generated in response to light reflected from abutting ones of said discrete area means; data processing circuitry means coupled to said transducer means to receive said analog signals, said data processing circuitry means including means responsive to particular combinations of amplitude values of said analog signals to determine the direction said transducer means is moved from a first discrete area means to a second discrete, abutting area means and to generate coordinate control signals indicative thereof; and control signal means connected between said data processing circuitry means and said electron beam display device to conduct said coordinate control signals to said means to position said cursor whereby said cursor is moved in accordance with the movement of said transducer means.

2. A system to be used with an electron beam display device according to claim 1 wherein said surface means having a plurality of discrete area means is a gray scale grid.

3. A system to be used with an electron beam display device according to claim 1 wherein said data processing circuitry means is formed to recognize when the signals from said transducer means indicate that the transducer means has been moved from a first discrete area means to another discrete area means which does not abut said first discrete area means and wherein said data processing circuitry means is formed to refrain from generating new coordinate control signals upon the recognition of said transducer means moving to a non-abutting discrete area means.

4. A system to be used with an electron beam device according to claim 1 wherein each of said discrete area means is formed to provide an analog signal which differs from the analog signal generated from any abutting discrete area means by at least 2 units of amplitude.

5. A system to be used with an electron beam display device, which display device has a means to generate a cursor, including means to control the position thereof by coordinate control signals, said system formed to cause said cursor to be selectively and randomly moved on said display device, comprising in combination: transducer means having light source means and light sensitive means, said light sensitive means designed to generate an analog signal whose amplitude is commenserate with the amount of light reflected from a surface to said light sensitive means; web means having a plurality of gray scale area means formed in a grid thereon with each of said gray scale area means lying in abutment with other gray scale area means, each of said gray scale area means formed to be a different shade of gray than each of said gray scale area means lying in abutment therewith; said transducer means for generating analog signals each of whose amplitude is indicative of the gray shade of the gray scale area means over which the transducer means is located when generating analog signals; analog to digital converter means connected to said transducer means to receive and convert said analog signals to binary coded signals which represent coded values for each of said gray scale area mean analog signals; signal decoder means connected to said analog to digital converter means to receive said binary coded signals and decode them into one of at least 15 hexadecimal signals each of which represents the hexadecimal coded value of a different one of said gray scale area means; data processing means formed and connected to receive said one of at least 15 hexadecimal and formed to process said hexadecimal signals and including means to determine that a movement of said transducer means from a first gray scale area means to a second gray scale area means is only to an abutting gray scale area means and including further means to generate coordinate control signals to cause said cursor to be moved in accordance with the movement of said transducer means; and circuitry means connected between said data processing means and said electron beam display device to transmit said coordinate control signals to said means to control the position of said cursor.

* * * * *